United States Patent Office 2,841,572
Patented July 1, 1958

2,841,572

WATER-SOLUBLE POLYESTERS

John Philip McMahon, Grosse Ile, Mich., assignor to Wyandotte Chemicals Corporation, Wyandotte, Mich., a corporation of Michigan No Drawing. Application December 14, 1955
Serial No. 552,981

7 Claims. (Cl. 260—75)

This invention relates to water-soluble polyesters. More particularly, this invention relates to novel, water-soluble polyesters which are prepared as by esterifying N,N,N',N' tetrakis (2-hydroxypropyl) alkylene diamine with certain dicarboxy alkyl ethers.

An outstanding development in the chemical arts has been that of plastic films. Cellophane, polyvinyl chloride and polyethylene have been the principal materials used in preparing such films for use in a wide variety of consumer goods such as packaging materials, shoes, shower curtains, draperies, etc. Heretofore, the development of these plastic films seems to have proceeded for the most part along the line of water-insolubility which property is undoubtedly desirable for many applications. However, there are a number of applications wherein a water-soluble film would be useful, chief amongst which would be packaging materials. For example, items that could be advantageously packaged in water-soluble films are frozen foods, soaps and detergents. Other applications of such water-soluble, film-forming materials would be as thickeners and in adhesives. Although a few such materials are known they have not gained a widespread acceptance for one reason or another.

Accordingly, it is an object of this invention to provide new, water-soluble, plastic materials.

Another object of this invention is to provide water-soluble, plastic materials capable of being cast into films suitable for packaging and wrapping and suitable for use as thickening agents and in adhesives.

These and other objects are achieved by this invention which, in summary, comprises a new class of water-soluble plastics which are polyesters of N,N,N',N' tetrakis (2-hydroxypropyl) alkylene diamine. These polyesters can be obtained by condensing a N,N,N',N' tetrakis (2-hydroxypropyl) alkylene diamine conforming to the structural formula:

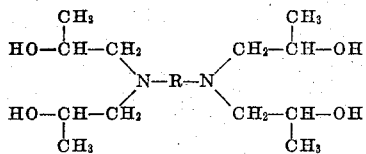

wherein R is an alkylene radical containing from 2 to 6 carbon atoms, with a dicarboxymethyl ether conforming to the structural formula:

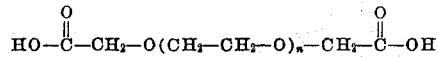

wherein n is an integer including zero.

The N,N,N',N' tetrakis (2-hydroxypropyl) alkylene diamines can be prepared according to the teachings of U. S. Patent No. 2,697,118. The dicarboxymethyl ethers of this invention can be prepared by the nitric acid oxidation of polyethylene glycols. Thus, glycolic acid can be prepared by the nitric acid oxidation of diethylene glycol, and ethylene bis-glycolic acid can be prepared by the nitric acid oxidation of triethylene glycol. These latter two dicarboxymethyl ethers are also obtainable as by-products in the synthesis of ethylene glycol from formaldehyde and carbon monoxide.

The condensation reaction of this invention can be performed by heating, preferably under agitation, a mixture of one of said dicarboxymethyl ethers and the N,N,N',N' tetrakis (2-hydroxypropyl) alkylene diamine in a mol ratio of about 2:1. Also, provision should preferably be made for the removal of water formed during the reaction in order to drive the reaction further to completion.

To more specifically illustrate the principle nad practice of this invention to those skilled in the art the following examples are set forth but it shall be understood that these examples are illustrative and not restrictive.

Example 1

Sixty-seven grams (0.5 mol) of diglycolic acid and 72.7 grams (0.25 mol) of N,N,N',N' tetrakis (2-hydroxypropyl) ethylene diamine were heated together for about two hours at a temperature which ranged from about 105° C. to 155° C., in a 500 cc. round bottom flask provided with a reflux condenser and a stirrer which agitated the mixture. Heating was discontinued and the contents of the flask were allowed to cool over night to room temperature. The next morning the contents of the flask were found to have solidified to a clear, amber colored resin with a thin, liquid layer on top. The resinous composition was heated up again and complete liquefaction of the flask contents occurred. After holding the temperature at about 100° C. for about 30 minutes, the condenser was turned to a downward position, a vacuum of 5 mm. Hg was applied thereto, and the contents of the flask were heated for about 30 minutes to a temperature of 155° C., during which time the flask contents were dehydrated and became very viscous. While still hot (150° C.) the contents of the flask were poured out into a glass pie plate. After cooling to room temperature the resin was observed to have solidified and thereafter to be very hard and brittle with a light, transparent amber color. Ten grams of the resin were then placed in a small Erlenmeyer flask containing 20 grams of water. The contents were shaken up and allowed to stand in the flask for about two hours. During this time the resin went completely into solution, thus indicating that it was very water-soluble.

Example 2

One hundred fifteen grams (0.5 mol) of a dicarboxymethyl ether prepared by the nitric acid oxidation of a polyethylene glycol having a molecular weight of 231, said ether being a product in which n in the ether formula previously set forth has an average value of 2.2, and 72.7 grams (0.25 mol) of N,N,N',N' tetrakis (2-hydroxypropyl) ethylene diamine were mixed together in a 500 cc. round bottom three-necked flask equipped with a reflux condenser, stirrer, and a nitrogen jet. The reactants were heated up to 159° C. under nitrogen while stirring for a period of about three hours at which point the reflux condenser was adjusted to a downward position and water vapor was taken off for a period of about one-half hour under reduced pressure at a temperature ranging from about 125° C. to 158° C. The amount of water recovered in this fashion from the reaction mixture was about 14 grams, thus representing about 2 mols of water per mol of N,N,N',N' tetrakis (2-hydroxypropyl) ethylene diamine. At the end of this operation the material within the flask set to a solid, stopping the stirrer. Upon cooling the flask contents the material was observed to be sticky, very elastic, and soluble in water to some extent.

Example 3

Eleven and five-tenths grams (0.05 mol) of the carboxymethyl diether of the polyethylene glycol of 231 molecular weight described in Example 2 and 7.25 grams (0.025 mol) of N,N,N',N' tetrakis (2-hydroxypropyl)-ethylene diamine were stirred together in a 150 cc. breaker. Five grams of this mixture were then dissolved in five grams of the monobutyl ether of ethylene glycol. A sample of this mixture was then poured over the surface of a Petri dish which thereafter was placed on a hot plate. After applying heat to the dish for about 5 minutes a sticky film was observed on the dish. The dish was then placed in an oven at 130° C. After 15 minutes the film on the dish was found to have lost its stickiness. After further heating in the oven at 130° C. for about an hour and a half the film was observed to be dry, tough and water-soluble. It was also observed to have good abrasion resistance. The dish was again placed in the oven and heated over night after which it was again observed to be water-soluble. Still another over night heating at 130° C. was given to the film after which it was observed to have the same properties as before. It did not become soft and tacky and it would appear that the film is very stable to heat.

While the foregoing discussion has emphasized the utility of the polyesters of this invention in the preparation of water-soluble films, it should be mentioned that these novel compositions of matter have utility in many other fields. For example, these polyesters are excellent binders for formulated alkylarylsulfonate detergents and may therefore be employed in the preparation of non-tacky detergent bars.

What is claimed is:

1. A water-soluble polyester which is the condensation product of N,N,N',N' tetrakis (2-hydroxypropyl) alkylene diamine conforming to the structural formula:

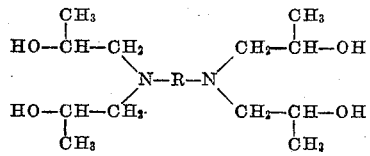

wherein R is an alkylene radical containing from 2 to 6 carbon atoms, and a dicarboxymethyl ether conforming to the structural formula:

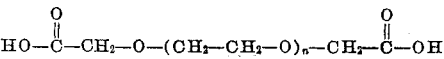

wherein $n$ is an integer including zero.

2. A water-soluble polyester which is the condensation product according to claim 1 wherein R is an ethylene radical and $n$ is 1.

3. A water-soluble polyester which is the condensation product according to claim 1 wherein R is an ethylene radical and $n$ has an average value of 2.2.

4. A process for making water-soluble plastic materials which comprises condensing a mixture consisting essentially of an N,N,N',N' tetrakis (2-hydroxypropyl) alkylene diamine conforming to the structural formula:

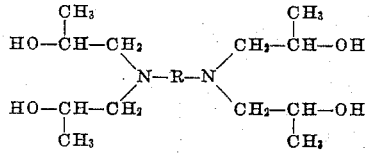

wherein R is an alkylene radical containing from 2 to 6 carbon atoms, and a dicarboxymethyl ether conforming to the structural formula:

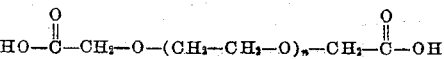

wherein $n$ is an integer including zero.

5. A process according to claim 4 wherein said diamine is N,N,N',N' tetrakis (2-hydroxypropyl) ethylene diamine.

6. A process according to claim 4 wherein said ether is diglycolic acid.

7. A process according to claim 4 wherein $n$ has an average value of 2.2.

References Cited in the file of this patent

UNITED STATES PATENTS

| | | |
|---|---|---|
| 2,262,738 | De Groote | Nov. 11, 1941 |
| 2,697,113 | Lundsted et al. | Dec. 14, 1954 |